US005689874A

United States Patent [19]
College

[11] Patent Number: 5,689,874
[45] Date of Patent: Nov. 25, 1997

[54] WIRE CUT AND STRIP MECHANISM

[75] Inventor: David Alan College, Annville, Pa.

[73] Assignee: The Whitaker Corporation, Wilmington, Del.

[21] Appl. No.: 717,029

[22] Filed: Sep. 20, 1996

[51] Int. Cl.$^{6}$ .............................. H01R 43/28; H02G 1/12
[52] U.S. Cl. .............................. 29/564.4; 81/9.51
[58] Field of Search .............................. 29/564.4, 33 M, 29/564.8, 564.6, 566.3; 81/9.51, 9.43

[56] References Cited

U.S. PATENT DOCUMENTS

| | | | |
|---|---|---|---|
| 4,630,353 | 12/1986 | Okazaki et al. | 29/564.4 |
| 4,646,404 | 3/1987 | Matsui | 29/564.4 |
| 4,713,880 | 12/1987 | Dusel et al. | 29/564.4 |
| 4,803,903 | 2/1989 | Wolter et al. | 81/9.43 |
| 4,879,926 | 11/1989 | Wollermann et al. | 81/9.51 |
| 5,146,673 | 9/1992 | Hoffa | 29/828 |
| 5,398,573 | 3/1995 | Wollermann | 81/9.51 |
| 5,539,967 | 7/1996 | Nazerian et al. | 29/33 M |

FOREIGN PATENT DOCUMENTS

| | | | |
|---|---|---|---|
| 174823 | 3/1986 | European Pat. Off. | 29/564.4 |

*Primary Examiner*—William R. Briggs
*Attorney, Agent, or Firm*—Timothy J. Aberle

[57] ABSTRACT

A wire cutting and stripping mechanism (22) for use with a wire processing machine (10) is disclosed. The mechanism includes a pair of cutting and stripping blade (180, 182, 184) tool holders (60, 62) which are slidingly coupled to the frame (16) of the machine. The tool holders are arranged to move toward a wire (12) to be processed in two discrete amounts of movement which are separable by a pause in movement. A pair of cylinders (130, 132) are interconnected to effect these two discrete movements. During the first movement the wire 12 is severed, followed by a pause in movement while the cut wire is repositioned axially with respect to the stripping blades (182, 184). The second movement is then initiated to sever the insulation, the stripping blades (182, 184) being held in position while the wire is withdrawn to strip off the slug (196) of cut insulation.

12 Claims, 8 Drawing Sheets

WIRE CUT AND STRIP MECHANISM

The present invention relates to wire processing machines and more particularly to an improved mechanism for cutting a wire to length and stripping the insulation from the cut ends.

BACKGROUND OF THE INVENTION

Machines that utilize electrical wire in the manufacture of a product typically draw lengths of wire from an endless source, such as a reel, and feed the drawn wire into mechanisms that operate on the wire in some way to produce the product. Sometimes the wire is cut to a specific length and it becomes the product, other times the wire is used to interconnect electrical components in a product. The former, for example, is made by a machine that is typically called a "lead maker" in the industry. These machines draw wire from an endless source, measuring its length precisely, then cutting it to a desired length. The ends may or may not be terminated to electrical terminals, or the ends may simply be prepared for termination. A wire cutting and stripping unit is provided having a set of cutting blades for cutting the wire and a separate set of stripping blades for stripping a desired length of insulation from the ends of the wire, as may be required. Usually, the wire cutting blades and the stripping blades are fixed in a common tool holder that is movable toward and away from the wire path. The cutting blades extend further outwardly so that as the tool holder is advanced toward the wire the cutting blades engage and cut the wire followed immediately by the stripping blades engaging the wire and severing the insulation. The wire is then pulled axially away from the cutting and stripping unit so that the cut slug of insulation is stripped away from the wire. This structure requires that the stripping blades be spaced from the cutting blades a predetermined distance that corresponds to the desired length of the strip. When a wire requiring a different length of strip is processed, the spacing between the stripping blades and the cutting blades must be adjusted, usually by inserting or removing spacers. This requires that the machine by taken out of service while this is done. To overcome this undesirable requirement, a stepper motor has been used to advance the tool holder toward the wire in two distinct steps. In the first step the wire is severed and the advancement of the tool holder is momentarily stopped. The wire is then repositioned axially with respect to the stripping blades by the wire feed system. The stepper motor then resumes moving the tool holder so that the stripping blades engage and sever the insulation at the desired place and, as above, the wire withdrawn axially to strip away the slug of insulation. This has the advantage that the strip length is controllable through automation so that wires having different strip length requirement can be processed by the lead maker in succession without stopping the machine for adjustment. While the use of stepper motors in this way is advantageous an important drawback is that the motor and control system required to operate the motor is complex and expensive.

What is needed is a simple and inexpensive wire cutting and stripping unit that advances the tool holder so that the cutting blades sever the wire and then momentarily stops while the wire is repositioned and then again resumes advancement so that the stripping blades engage and sever the insulation.

SUMMARY OF THE INVENTION

A wire cutting and stripping mechanism is disclosed for use with a wire processing machine. The mechanism includes a frame and first and second opposed tool holders on opposite sides of a wire path adapted for carrying wire cutting and stripping blades. The first and second tool holders are coupled to the frame by means of a first coupling and arranged to move toward the wire path in two discrete amounts of movements which are separable by a pause in movement, upon actuation of the first coupling. An actuator is provided for actuating the first coupling and includes a first cylinder having a first housing and a first piston rod extending therefrom wherein the housing of the first cylinder is attached to the frame. A second cylinder is provided having a second housing and second piston rod extending therefrom in operational engagement with the first coupling. Means is included for actuation of one of the first and second cylinders so that the first discrete movement is effected and means is additionally included for actuation of the other of the first and second cylinders so that the second discrete movement is effected.

DESCRIPTION OF THE PREFERRED EMBODIMENT

Figure 1:
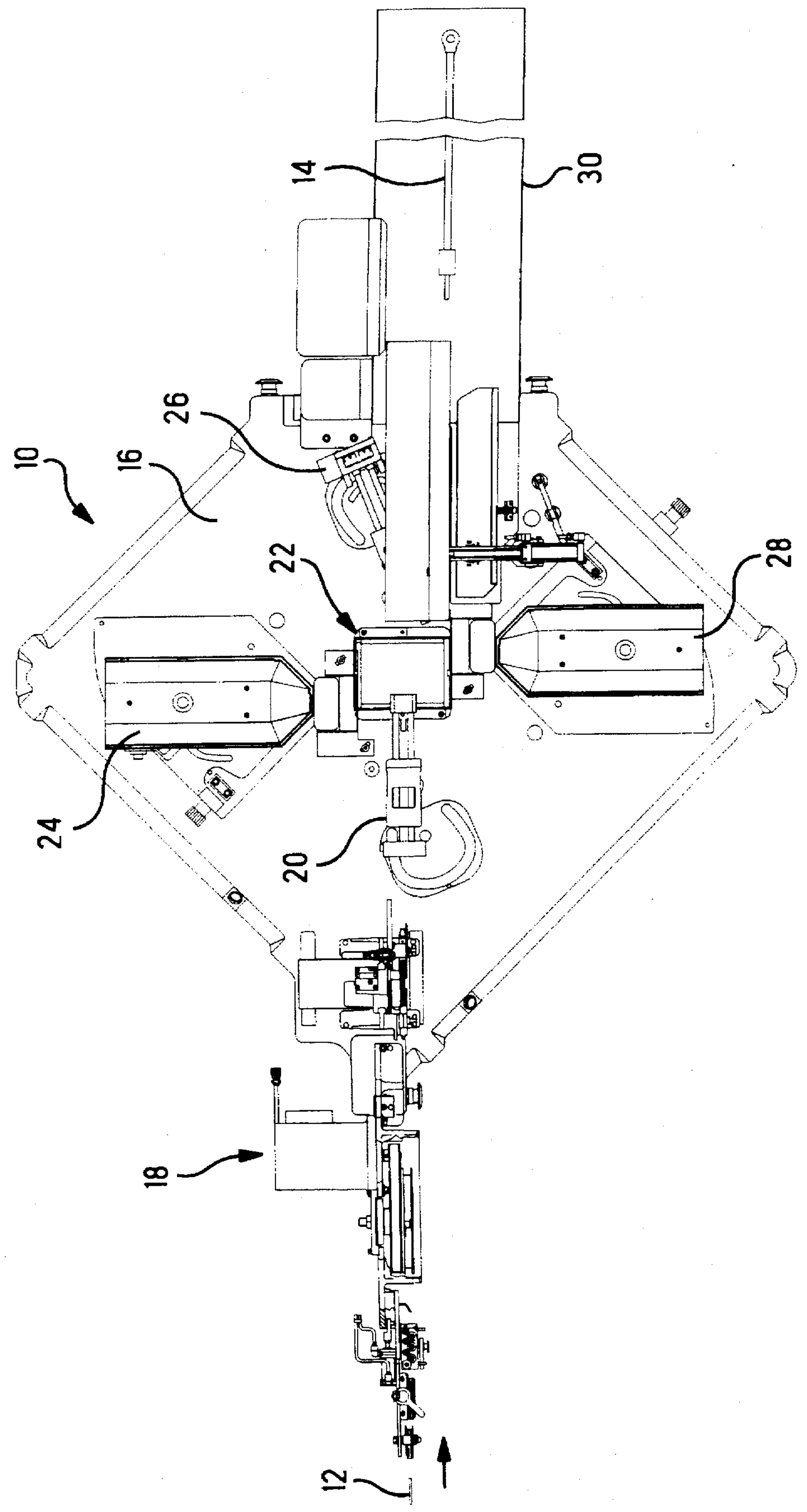
FIG. 1 is a top view of a wire processing machine having a wire cutting and stripping mechanism incorporating the teachings of the present invention.
Figure 2:
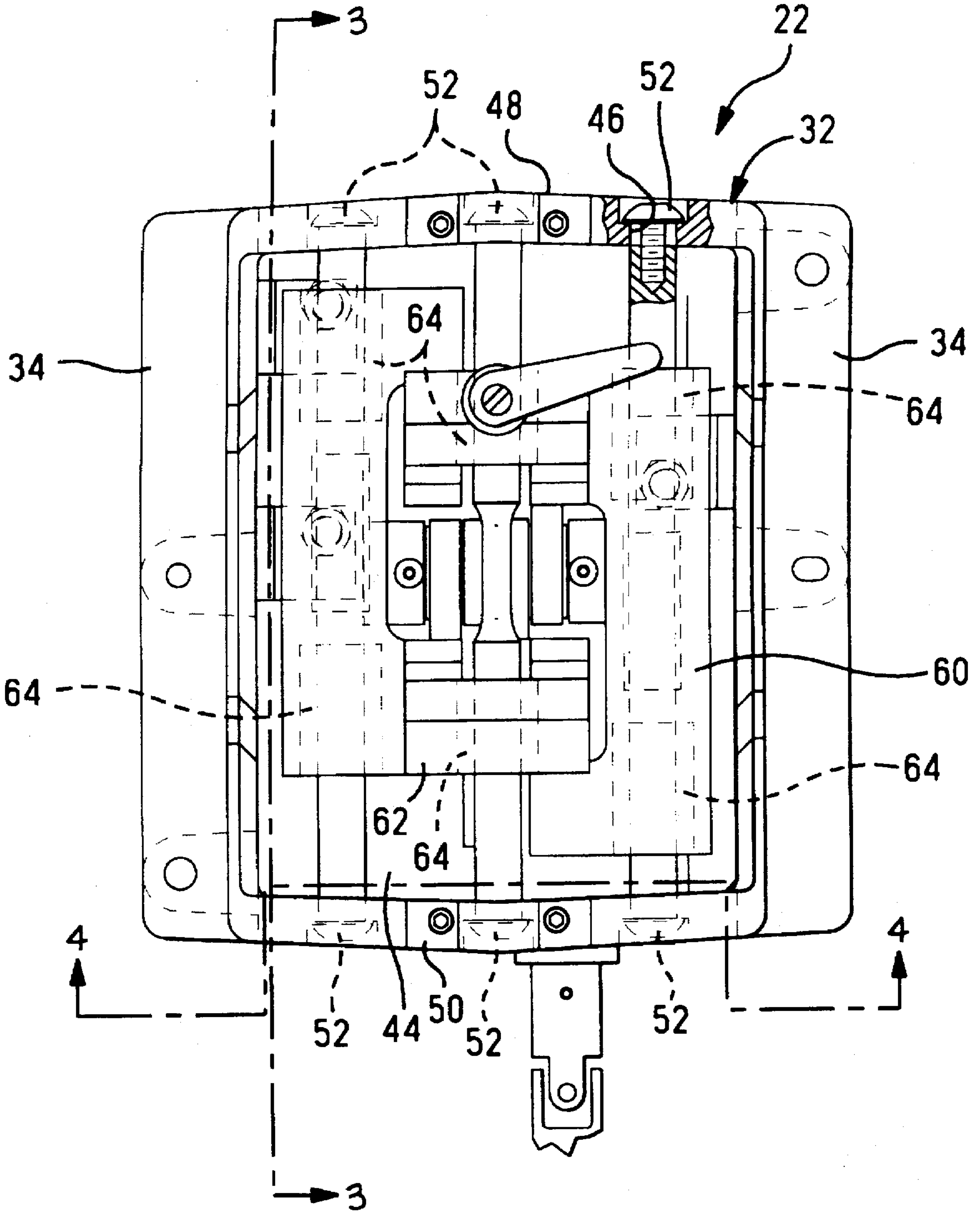
FIG. 2 is a top view of the wire cutting and stripping mechanism shown in FIG. 1.

There is shown in FIG. 1 a wire processing machine 10 for receiving a continuous length of wire 12 in the making of electrical leads 14. The machine 10 includes a frame 16 and a wire inlet assembly 18 attached to the frame which straightens the wire and feeds it into the processing portion of the machine. A feed side wire transfer unit 20 is arranged to position the wire with respect to a wire cutting and stripping unit 22 for cutting the lead 14 to length and for stripping the insulation from the cut ends of the wire 12 and lead 14, as desired. Additionally, the feed side transfer unit 20 will position the cut end of the wire 12 in terminating tooling held by a feed side terminating unit 24 for attachment of a terminal, if required. The partially completed lead 14 is then received by an eject side transfer unit 26 which positions the end of the lead in terminating tooling held by an eject side terminating unit 28 for attachment of a terminal, if required. The completed lead is then ejected into a stacking tray 30, as shown in FIG. 1.

Figure 3:
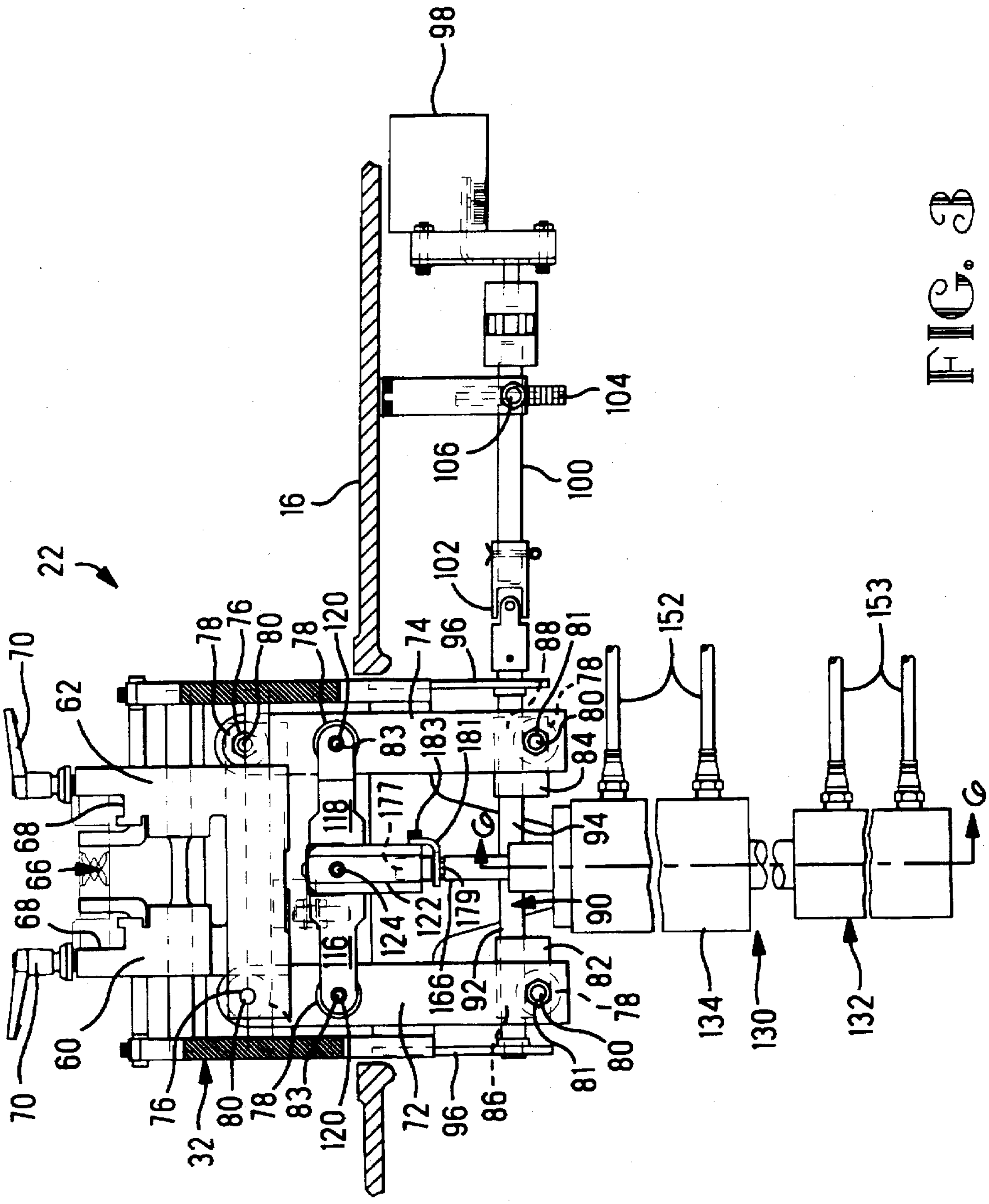
FIG. 3 is a cross-sectional view taken along the lines 3—3 in FIG. 2, showing the actuating mechanism in a fully closed position.
Figure 4:
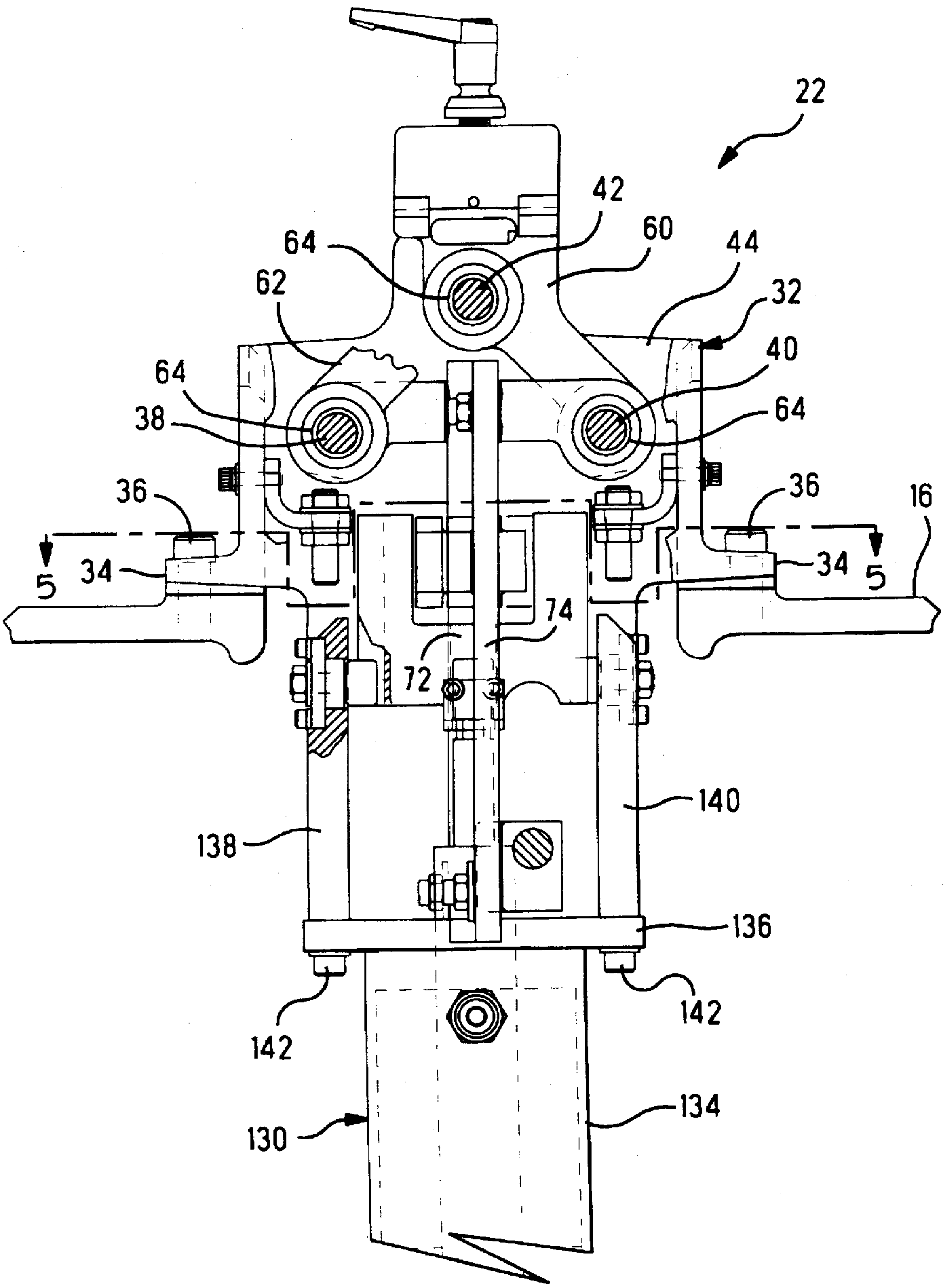
FIG. 4 is a cross-sectional view taken along the lines 4—4 in FIG. 2.
Figure 5:
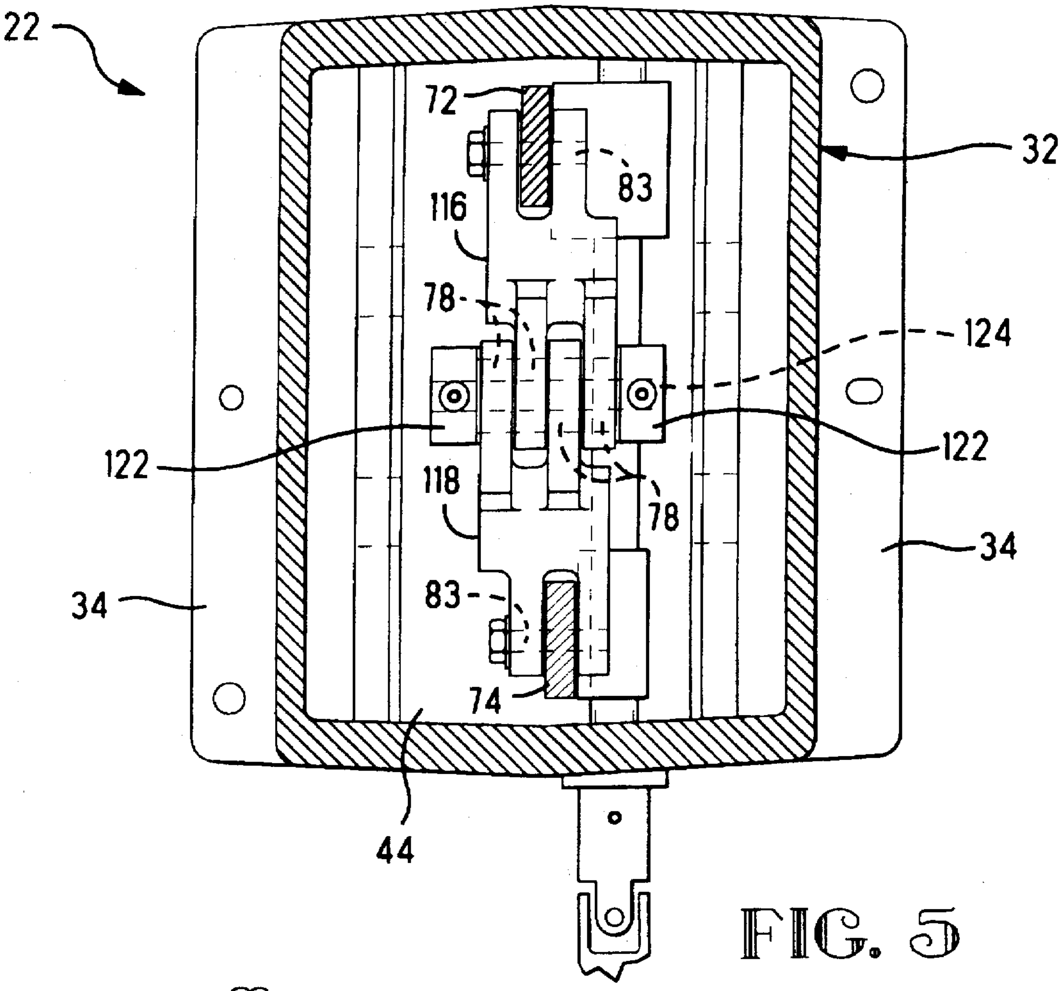
FIG. 5 is a cross-sectional view taken along the lines 5—5 in FIG. 4.

The wire cutting and stripping unit 22, as shown in FIGS. 2, 3, 4, and 5, includes a cast housing 32 having a pair of mounting flanges 34 on opposite sides which are secured to the frame 16 by means of screws 36 extending through clearance holes in the flanges and into threaded holes in the frame, as best seen in FIG. 4. Three parallel rails 38, 40, and 42 are disposed within a cavity 44 of the housing 32, their ends being in slip fit bores 46 formed through the left and right side walls 48 and 50, respectively. A large head screw 52 is threaded into a hole in each end of each rail 38, 40, 42 thereby holding the rails within their respective bores 46. Left and right tool holders 60 and 62, respectively, are slidingly coupled to the rails by means of linear ball bushings 64 that are disposed in enlarged bores in the tool holders. As best seen in FIG. 3, a set 66 of wire cutting and stripping blades is secured in nests 68 in the tool holders 60 and 62 by means of two manually operable clamps 70. Left and right drive links 72 and 74 are arranged within the cavity 44, each upper end being pivotally attached at 76 to a respective left and right tool holder 60 and 62. Each pivotal attachment includes a spherical bearing 78 tightly held in a hole in the link and a screw 80 extending through a hole in the spherical bearing and into a threaded hole in the link. The opposite ends of the two drive links 72 and 74 are similarly pivotally attached at 81 to left and right support blocks 82 and 84 by means of spherical bearings 78 and screws 80. The left support block has a left hand threaded bore 86 formed therethrough and the right support block has a right hand threaded bore 88 formed therethrough. An adjusting screw 90 includes left and right hand threaded portions 92 and 94 in threaded engagement with the left and right hand threaded bores 86 and 88, respectively. The two support blocks and the adjusting screw are free to move vertically a small amount, as viewed in FIG. 3, but are restrained from lateral movement by two guide members 96 which have elongated openings for passage of the adjusting screw. The adjusting screw 90 is selectively rotated by means of a gear reduced motor 98, shaft 100, and coupling 102. A toothed wheel 104 is attached to the shaft 100 and is adjacent a sensor 106 that is used to track rotational movement of the adjusting screw. A pair of left and right toggle links 116 and 118, respectively, have their free ends pivotally attached to the two drive links at 120 intermediate each drive link's two ends. These pivotal attachments 120 are effected by means of spherical bearings 78 disposed in holes in the two drive links 72 and 74 and roll pins 83 that extend through the bearings and into press fit engagement with holes in each leg of the toggle links 116 and 118. The two toggle links 116 and 118 are pivotally attached at their coupled ends to a clevis 122 by means of spherical bearings 78 disposed in holes in each leg of both toggle links, as best seen in FIG. 5, and a roll pin 124 that extends through the spherical bearings and a press fit hole through each leg of the clevis 122. The purpose of the adjusting screw 90 is to selective and precisely position the cutting and stripping blades by adjusting the distance between the two pivotal attachments 81. When this distance is increased the cutting and stripping blades cut more deeply into the insulation 12. When this distance in reduced the cutting and stripping blades cut less deeply. Since the movement of the adjusting screw 90 is controlled by the motor 98, this adjusting function may be easily automated.

Figure 6:
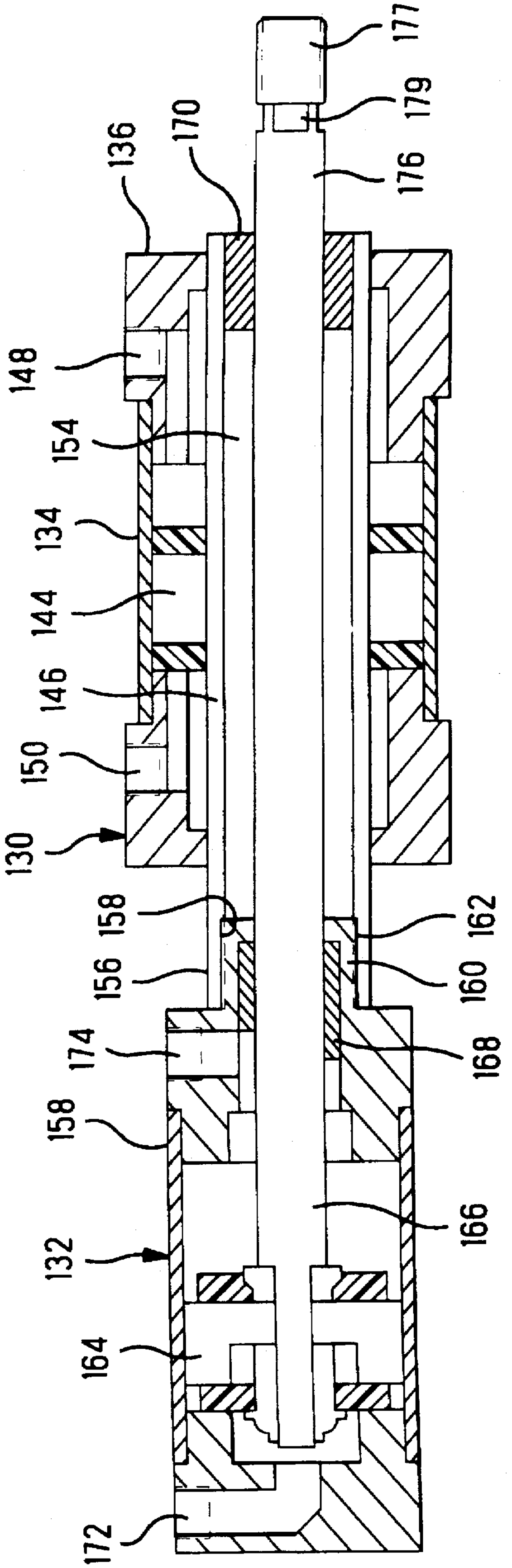
FIG. 6 is a cross-sectional view taken along the lines 6—6 in FIG. 3.

First and second linear actuators 130 and 132, air cylinders in the present example, are arranged in tandem, as shown in FIG. 3. The first air cylinder 130 includes a housing 134 having a mounting flange 136 that is secured to downwardly extending wall members 138 and 140 by means of screws 142, as best seen in FIG. 4. The wall members 138 and 140 extend from and are part of the housing 32. As shown in FIG. 6, the first cylinder 130 includes a first piston 144 attached to a first piston rod 146 that extends out of both ends of the housing 134. Ports 148 and 150 are in communication with the interior of the cylinder on opposite sides of the piston 144 for receiving charges of compressed air in the operation of the cylinder, in the usual manner. Suitable air lines 152 are attached to the ports 148 and 150 for this purpose, as shown in FIG. 3. The first piston rod 146 includes an axially formed bore 154 extending completely through the piston rod. The end 156 facing the second cylinder 132 has an internal thread 158. The second cylinder 132 has a housing 158 with a mounting nipple 160 extending therefrom. The mounting nipple 160 has an outside thread 162 formed thereon that is in tight threaded engagement with the internal thread 158 so that the entire second cylinder 132 is secured to and carried by the first piston rod 146. The second cylinder 132 includes a second piston 164 attached to a second piston rod 166 which extends through a bearing 168, the mounting nipple 160, and completely through the bore 154 of the first piston rod 146. A support bearing 170 is disposed in the end of the bore 154 opposite the end having the threads 158, for supporting the end 176 of the second piston rod 166. Two ports 172 and 174 are in communication with the interior of the second cylinder 132 on opposite sides of the piston 164 for receiving charges of compressed air in the operation of the cylinder, in the usual manner. Suitable air lines 153 are attached to the ports 172 and 174 for this purpose, as shown in FIG. 3. The end 176 of the second piston rod includes a threaded portion 177, as shown in FIG. 6, that is in threaded engagement with a threaded hole formed in the clevis 122, as shown in FIG. 3. Flats 179 are formed on the end 176 adjacent the portion 177. An L-shaped bracket 181 is attached to the side of the clevis by means of a screw 183 and includes a bifurcated end that straddles two opposite flats 179 thereby preventing rotation of the second piston rod 166 and retaining it in engagement with the clevis 122.

Figure 7:
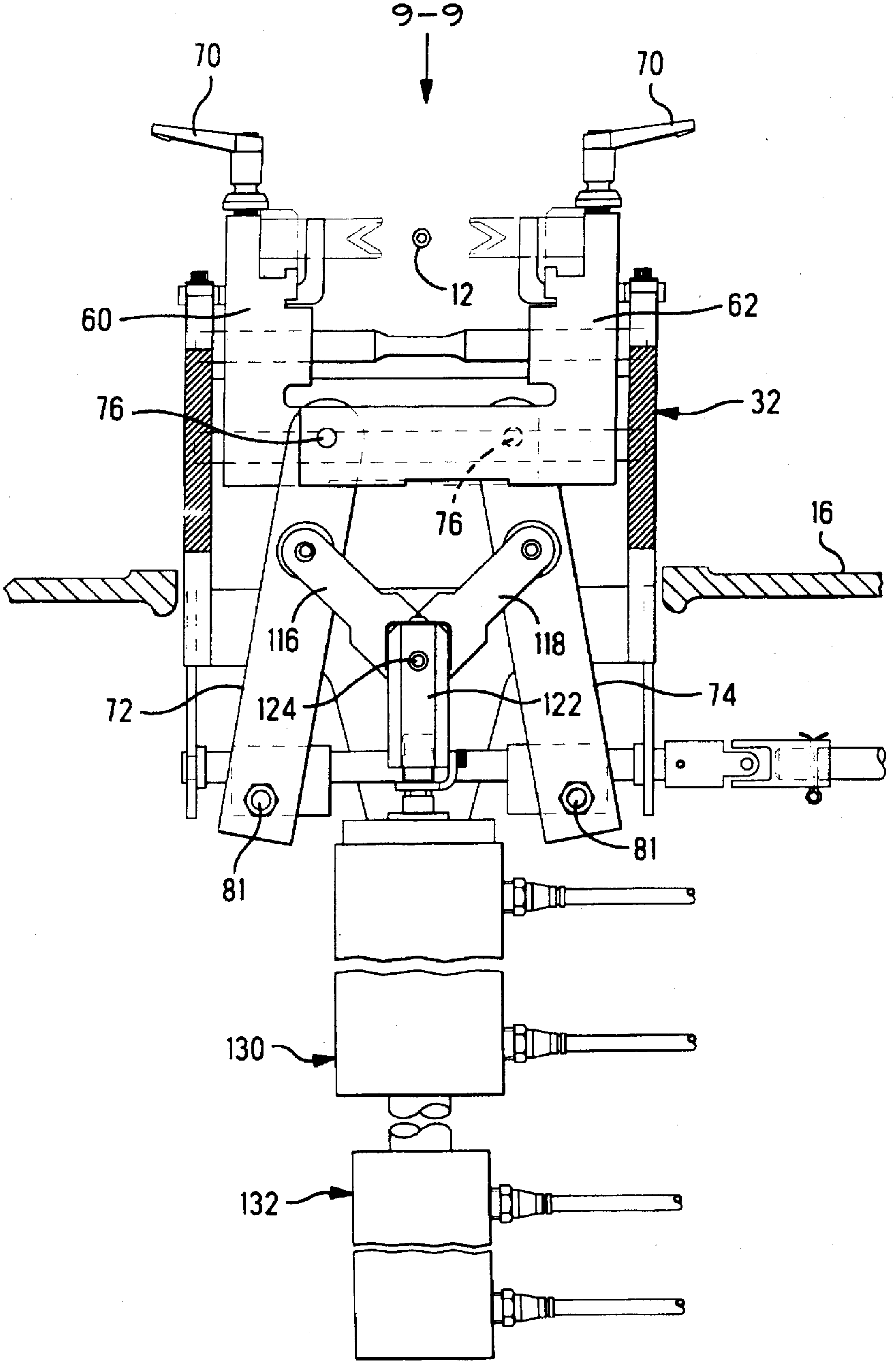
FIG. 7 is a portion of a view similar to that of FIG. 3 showing the actuating mechanism in a fully open position.
Figure 9A:
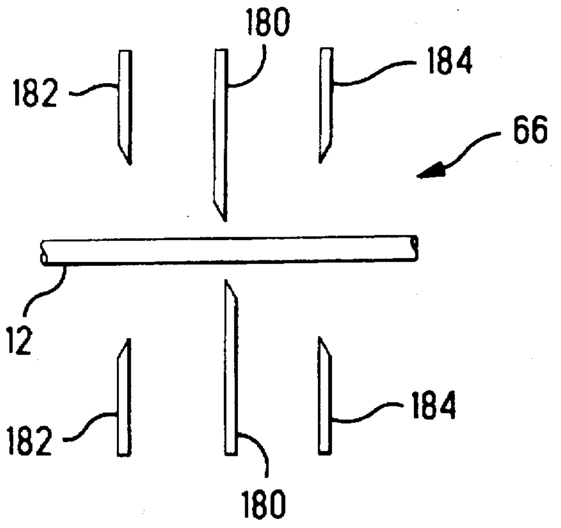
FIGS. 9A, 9B, 9C, and 9D are schematic representations of the wire cutting and stripping blades in various operating positions.
Figure 9B:
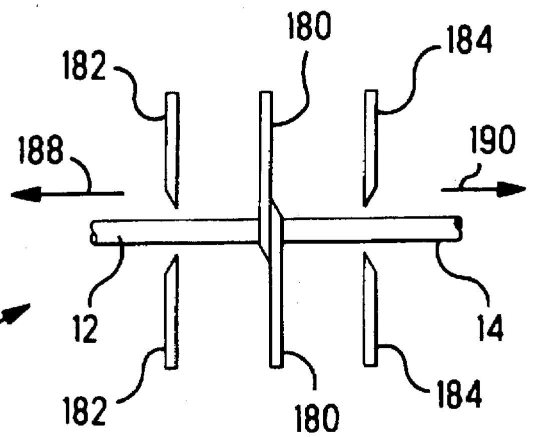
Figure 9C:
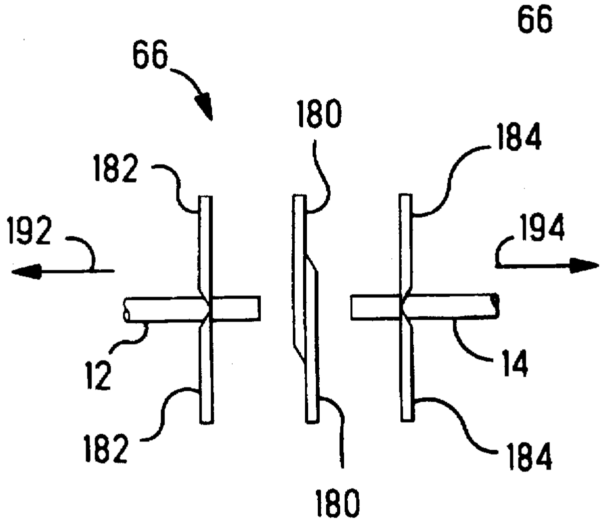
Figure 9D:
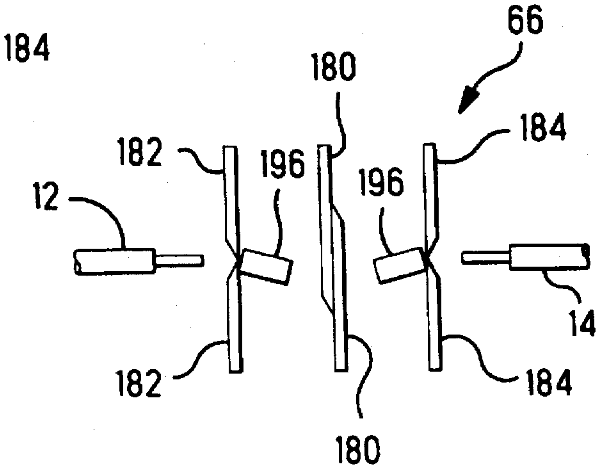

The operation of the wire cutting and stripping unit 22 will now be described with reference to FIGS. 3, 6, 7, and 9A through 9D. FIGS. 9A through 9D schematically represent the set 66 of wire cutting a stripping blades, as viewed at lines 9—9 in FIG. 7. In these figures the set 66 of wire cutting and stripping blades includes two opposed wire cutting blades 180, two opposed feed side stripping blades 182, and two opposed eject side stripping blades 184. As shown in FIG. 7, the piston rods of both cylinders 130 and 132 are retracted so that the left and right tool holders 60 and 62 are spaced furthest apart in their open position. To begin, the wire cutting and stripping unit 22 is in its open position, shown in FIGS. 9A and 7 and the ports 174 and 150 are pressurized with charges of compressed air in the usual manner. This holds the second piston 164 against the bottom of the second cylinder with the second piston rod 166 fully retracted, as shown in FIG. 6, while the first piston 144 begins moving toward the right. As the first piston 144 and attached piston rod 146 move toward the right, the entire second cylinder 132 and its piston rod 166 are also moved therewith toward the right as a unit. This causes the clevis 122 to move upwardly, as viewed in FIG. 7, so that the left and right toggle links 116 and 118 begin to straighten thereby forcing the left and right drive links 72 and 74 apart. As the left and right drive links 72 and 74 move apart they pivot about the pivotal attachments 81 associated with the left and right support blocks 82 and 84 while their upper ends move the left and right tool holders 60 and 62 toward each other so that the wire cutting and stripping blades begin to close on the wire 12. This movement continues as the wire cutting blades 180 meet and sever the wire thereby forming a partially completed lead 14, as shown in FIG. 9B, the first piston 144 having engaged the end of its cylinder and unable to move further. At this point there is a pause in movement of the cutting and stripping blades, their relative positions being shown in FIG. 9B, while the feed side transfer unit 20 retracts the cut end of the wire 12 and the eject side transfer unit 26 retracts the cut end of the lead 14 in the direction of the arrows 188 and 190, respectively, as shown in FIG. 9B. The purpose of this retraction of the wire 12 and lead 14 is to position the cut ends with respect to the stripping blades 182 and 184 so that a desired length of insulation can be removed from each. When the transfer units 20 and 26 have properly positioned their respective wire and lead ends, the port 172 is then pressurized with a charge of compressed air and the port 174 is shunted to exhaust, while the port 150 remains pressurized. This causes the second piston 164 and attached piston rod 166 to move further toward the right, as viewed in FIG. 6, so that the right and left toggle links 116 and 118 straighten to the closed position shown in FIG. 3. In this position, the second piston 164 has engaged the end of its cylinder and can move no further. The wire cutting and stripping blades 180, 182, and 184 now occupy the positions shown in FIG. 9C where the stripping blades have severed the insulation on both the wire 12 and the lead 14 but have not contacted the underlying conductors. While pressure is maintained in both ports 150 and 172, the feed side transfer unit 20 moves the wire 12 in the direction of the arrow 192 and the eject side transfer unit 26 moves the lead 14 in the direction of the arrow 194, as shown in FIG. 9C, to their respective positions shown in FIG. 9D. This movement of the wire and lead serves to strip the severed slugs 196 of insulation from their ends, whereupon the slugs fall by gravity to a scrap collection system for removal. The ports 150 and 172 are then shunted to exhaust and the ports 148 and 174 again pressurized to return the pistons and attached piston rods to their starting positions, as shown in FIG. 6. This brings the toggle mechanism and left and right tool holders 60 and 62 to their open position, shown in FIG. 7, and the set 66 of wire cutting and stripping blades to their open position shown in FIG. 9A. The eject side transfer unit 26 then processes the lead 14, in the usual manner, and the wire 12 is again advanced into the wire cutting and stripping unit 22 and the process repeated, as desired.

Figure 8:
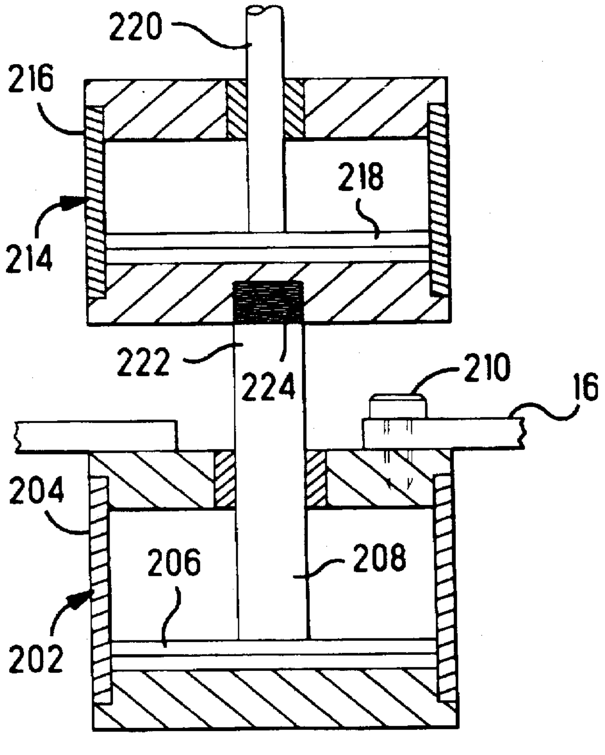
FIG. 8 is a cross-sectional view similar to that of FIG. 6 showing an alternative embodiment of the cylinders.

While the present invention has been describe with reference to a specific structure, variations in this structure may be made which fall within the scope of the teachings of the invention. Such variations may include a cylinder arrangement, as shown in FIG. 8. There, a first cylinder 202 is shown having a first housing 204, a first piston 206, and a first piston rod 208, the first housing being attached to the frame 16 by means of screws 210. A second cylinder 214 having a second housing 216, second piston 218, and second piston rod 220 is arranged in tandem with the first cylinder 202. The free end 222 of the first piston rod 208 is in threaded engagement with a threaded hole 224 formed in the second housing 216 so that the second cylinder 214 is carried by and moves with the first piston rod 208. While the cylinders 202 and 214 shown in FIG. 8 illustrate a suitable alternative to the cylinders 130 and 132, these structures are by way of example only and it will be understood that other similar alternative structures may be utilized in the practice of the present invention.

An important advantage of the present invention is that a simple and inexpensive wire cutting and stripping unit is provided that advances the tool holder so that the cutting blades sever the wire and then momentarily stop while the wire is repositioned and then again resume advancement so that the stripping blades engage and sever the insulation. Additionally, the simpler structure of the unit is relatively easy to maintain while providing accurate and reliable control of the length of the striped end of wire.

I claim:

1. A wire cutting and stripping mechanism having a frame, first and second opposed tool holders on opposite sides of a wire path adapted for carrying wire cutting and stripping blades; said first and second tool holders coupled to said frame by means of a first coupling and arranged to move toward said wire path in two discrete amounts of movements, separable by a pause in movement, upon actuation of said first coupling, and an actuator for effecting said actuation of said first coupling, said actuator comprising:

(a) a first cylinder having a first housing and a first piston rod extending therefrom, said housing of said first cylinder being attached to said frame;

(b) a second cylinder having a second housing and second piston rod extending therefrom in operational engagement with said first coupling;

(c) means for actuation of one of said first and second cylinders so that said first discrete movement is effected; and (d) means for actuation of the other of said first and second cylinders so that said second discrete movement is effected.

2. The mechanism according to claim 1 wherein said second housing is attached to and carried by said first piston rod.

3. The mechanism according to claim 2 wherein said first and second cylinders are air cylinders and said means for actuating said one cylinder is a first charge of compressed air and said means for actuating said other cylinder is a second charge of compressed air different from said first charge of air.

4. The mechanism according to claim 2 wherein said first piston rod extends completely through said first housing and includes a first hole formed axially through said first piston rod, and wherein said second piston rod extends through said first hole, said first cylinder being between said second cylinder and said first coupling.

5. The mechanism according to claim 4 wherein said second housing has an extended end through which said second piston rod extends, said extended end having an external threaded portion that is in tight threaded engagement with a threaded hole in an end of said first piston rod for effecting said attachment of said second housing to said first piston rod.

6. The mechanism according to claim 5 wherein said first piston rod includes a support member within said first hole in sliding and supporting engagement with said second piston rod.

7. The mechanism according to claim 2 wherein said second cylinder is between said first cylinder and said first coupling.

8. The mechanism according to claim 2 wherein said first and second tool holders are slidingly coupled to said frame and said first coupling comprises a pair of spaced apart drive links, each of which has a first end pivotally coupled to a respective one of said first and second tool holders and a second end pivotally coupled to an adjusting means, and a pair of toggle links, one end of each being pivotally attached to said second piston rod and the other ends of which are pivotally attached to a respective one of said drive links.

9. The mechanism according to claim 8 wherein said pivotal couplings of said second ends are spaced apart a first distance and said adjusting means is arranged for selectively altering said first distance.

10. The mechanism according to claim 8 wherein said first and second tool holders are slidingly coupled to said frame by means of parallel rods attached to said frame and extending through holes in said first and second tool holders.

11. The mechanism according to claim 10 wherein said adjusting means comprises a lead screw journaled for rotation in said frame, a first block having a first threaded hole pivotally attached to said second end of one of said drive links and a second block having a second threaded hole pivotally attached to said second end of the other of said drive links, each of said first and second threaded holes being in threaded engagement with said lead screw for effecting said pivotal coupling of said second ends to said adjusting means.

12. The mechanism according to claim 11 wherein said first threaded hole has a thread that is of opposite hand to the thread of said second threaded hole.

* * * * *